United States Patent
Sagitani

(10) Patent No.: US 10,273,350 B2
(45) Date of Patent: Apr. 30, 2019

(54) RUBBER MASTERBATCH, METHOD FOR PRODUCING THE SAME, AND RUBBER COMPOSITION OBTAINED FROM THE SAME

(71) Applicant: TOYO TIRE & RUBBER CO., LTD., Itami-shi, Hyogo (JP)

(72) Inventor: Satoshi Sagitani, Itami (JP)

(73) Assignee: Toyo Tire Corporation, Itami-shi (JP)

(*) Notice: Subject to any disclaimer, the term of this patent is extended or adjusted under 35 U.S.C. 154(b) by 36 days.

(21) Appl. No.: 15/800,317

(22) Filed: Nov. 1, 2017

(65) Prior Publication Data

US 2018/0171115 A1 Jun. 21, 2018

(30) Foreign Application Priority Data

Dec. 20, 2016 (JP) ................................ 2016-246283

(51) Int. Cl.
| | | |
|---|---|---|
| *C08L 9/00* | (2006.01) | |
| *C08L 21/02* | (2006.01) | |
| *C08K 9/06* | (2006.01) | |
| *C08J 3/05* | (2006.01) | |
| *C08K 3/04* | (2006.01) | |
| *C08J 3/22* | (2006.01) | |

(52) U.S. Cl.
CPC . *C08L 9/00* (2013.01); *C08J 3/05* (2013.01); *C08J 3/22* (2013.01); *C08K 3/041* (2017.05); *C08K 9/06* (2013.01); *C08L 21/02* (2013.01); *C08L 2310/00* (2013.01)

(58) Field of Classification Search
CPC .......... C08L 9/00; C08L 21/02; C08K 3/041; C08K 9/06; C08J 3/05; C08J 3/22

USPC .......................................................... 523/351
See application file for complete search history.

(56) References Cited

U.S. PATENT DOCUMENTS

| | | | |
|---|---|---|---|
| 2013/0203917 A1* | 8/2013 | Harris .................... | C08K 9/06 524/265 |
| 2014/0353556 A1 | 12/2014 | Shigeta et al. | |

FOREIGN PATENT DOCUMENTS

| | | |
|---|---|---|
| JP | 2004-210830 A | 7/2004 |
| JP | 2006-517996 A | 8/2006 |
| JP | 2014-505125 A | 2/2014 |
| WO | 2004/072159 A1 | 8/2004 |
| WO | 2012/080159 A1 | 6/2012 |
| WO | 2013/080912 A1 | 6/2013 |

OTHER PUBLICATIONS

Y. Nakaramontri et al., "Enhancement of Electrical Conductivity and Filler Dispersion of Carbon Nanotube Filled Natural Rubber Composites by Latex Mixing and In Situ Silanization", Rubber Chemistry and Technology, vol. 89, No. 2, pp. 272-291 (2016).

* cited by examiner

*Primary Examiner* — Edward J Cain
(74) *Attorney, Agent, or Firm* — Westerman, Hattori, Daniels & Adrian, LLP

(57) ABSTRACT

There are provided a rubber masterbatch which can give a vulcanized rubber having a low hysteresis loss while having a low electrical resistance (low volume electrical resistance value); and a method for producing the rubber masterbatch. The rubber master-batch is a rubber masterbatch including a diene rubber, a carbon nanotube, and a silane coupling agent, and the carbon nanotube shows a weight loss proportion of 10 to 30% by weight in a range from 200 to 600° C. in a thermogravimetry of the carbon nanotube.

5 Claims, No Drawings

RUBBER MASTERBATCH, METHOD FOR PRODUCING THE SAME, AND RUBBER COMPOSITION OBTAINED FROM THE SAME

BACKGROUND OF THE INVENTION

Field of the Invention

The present invention relates to a rubber masterbatch, a method for producing the rubber masterbatch, and a rubber composition obtained from the rubber masterbatch.

Description of the Related Art

It has been conventionally known that an elastomer composition excellent in fracture characteristics, tensile strength and other properties can foe obtained by adding a carbon nanotube to an elastomer such as a diene rubber (Patent Documents 1 and 2).

It is also known, that a carbon nanotube is wet-mixed with, for example, a rubber latex solution to yield a composition in which the carbon, nanotube is heighten in dispersibility and a high electroconductivity is exhibited (Patent Documents 3 and 4, and Non-Patent Document 1).

PRIOR ART DOCUMENTS

Patent Documents

Patent Document 1: JP-A-2004-210830
Patent Document 2: JP-A-2014-505125
Patent Document 3: WO 2013/080912
Patent Document 4: JP-A-2006-517996

Non-Patent Document

Non-Patent Document 1; RUBBER CHEMISTRY MID TECHNOLOGY, Vol. 89, No. 2, pp. 272-291 (2016)

A vulcanized rubber obtained from a carbon-nanotube-including rubber composition as described above is good in electroconductivity. Thus, the vulcanized rubber can be decreased in electrical resistance (volume electrical resistance value). However, the addition of the carbon nanotube causes a problem that the vulcanized rubber is increased in hysteresis loss (energy loss generated when the vulcanized rubber is repeatedly deformed).

SUMMARY OF THE INVENTION

In the light of the actual situation, the present invention has been made. An object thereof is to provide a rubber masterbatch which can give a vulcanized rubber having a low hysteresis loss while having a low electrical resistance (low volume electrical resistance value); and a method for producing the rubber masterbatch.

The present invention relates to a rubber masterbatch including a diene rubber, a carbon nanotube, and a silane coupling agent, wherein the carbon nanotube shows a weight loss proportion of 10 to 30% by weight in a range from 200 to 600° C. in a thermogravimetry of the carbon nanotube, and a rubber composition obtained from the rubber masterbatch.

The present invention also relates to a method for producing the above-mentioned rubber masterbatch including the step of dry-mixing and/or wet-mixing the diene rubber, the carbon nanotube, and the silane coupling agent with each other.

Details of an action mechanism of the advantages of the rubber masterbatch according to the present invention are unclear. The mechanism is however presumed as described below. However, the present invention may not be interpreted to be limited to any invention based on the action mechanism.

The rubber masterbatch of the present invention is a rubber masterbatch including a diene rubber, a carbon nanotube, and a silane coupling agent, wherein the carbon nanotube shows a weight loss proportion of 10 to 30% by weight in a range from 200 to 600° C. in a thermogravimetry of the carbon nanotube (hereinafter, the carbon nanotube may be referred to as the "organically modified carbon nanotube"). The use of the organically modified carbon nanotube and the silane coupling agent makes the carbon nanotube good in dispersibility in the resultant rubber masterbatch. It is presumed that this good dispersibility makes it possible to yield a vulcanized rubber having a low hysteresis loss while having a low electrical resistance (low volume electrical resistance value).

DETAILED DESCRIPTION OF THE PREFERRED EMBODIMENTS

Rubber Masterbatch

The rubber masterbatch of the present invention includes at least a diene rubber, a carbon nanotube, and a silane coupling agent, and the carbon nanotube shows a weight loss proportion of 10 to 30% by weight in a range from 200 to 600° C. in a thermogravimetry of the carbon nanotube.

Examples of the diene rubber include natural rubber (NR); and synthetic diene rubbers such as isoprene rubber (IR), styrene-butadiene rubber (SBR), butadiene rubber (BR), butyl rubber (IIR), acrylonitrile-butadiene rubber (NBR), and chloroprene rubber (OR). Such diene rubbers may be used singly or in any combination of two or more thereof.

The diene rubber may be used in the form of a rubber latex solution of the diene rubber. A dispersing solvent in the rubber latex solution is preferably water. Examples of the rubber latex solution include a natural rubber latex solution of concentrated latex or fresh latex named field latex; and a synthetic diene rubber latex solution produced by emulsion-polymerizing one or more monomers for the diene rubber. Such rubber latex solutions may be used singly or in any combination of two or more thereof.

The carbon nanotube shows a weight loss proportion of 10 to 30% by weight in a range from 200 to 600° C. in a thermogravimetry of the carbon nanotube (the carbon nanotube is an organically modified carbon nanotube). The weight loss proportion is defined as the proportion of a weight loss of one or more organic compounds bonded to the carbon nanotube. The bonding may be a chemical bonding (modifying), such as covalent bonding, or a physical bonding (modifying), such as micelle or physical adsorption. The weight loss proportion is preferably 15% by weight or more, more preferably 20% by weight or more, and is preferably 25% by weight or less to give a vulcanized rubber having a low electrical resistance and a low hysteresis loss.

For the thermogravimetry, a thermogravimeter manufactured by Shimadzu Corporation is used. The weight loss proportion of a carbon nanotube is gained by performing a thermogravimetry of a sample of the carbon nanotube which has a weight of about 5 mg at a temperature elevation rate of 10° C./min from an ambient temperature (about 25° C.) in a dry air atmosphere, and calculating out the loss proportion of the sample weight (weight loss percentage) in a range of 200 to 600° C.

Examples of the carbon nanotube include single-wall nanotube (SWT), which has a monolayered structure; multi-wall nanotube (MWNT), which is in the form of multilayered concentric tubes; and double-wall nanotube (DWNT), which has particularly a bilayered structure, our of nanotubes each having a multilayered structure. The method for synthesizing the carbon nanotube is, for example, an arc discharging method, a laser evaporation method or a chemical vapor deposition method (CVD method). Carbon nanotubes as described above may be used singly or in any combination of two or more thereof.

The diameter (average diameter) of tubes of the carbon nanotube is not particularly limited. Usually, the diameter is preferably from 0.1 to 200 nm, more preferably from 1 to 20 nm. The length (average length) of the tubes is not particularly limited. Usually, the length is preferably from 1 to 500 μm, more preferably from 5 to 100 μm.

The organic compound bonded to the carbon nanotube may be of any species as far as the organic compound species improves the carbon nanotube in dispersibility. The organic compound is, for example, an organic functional group, a low-molecular-weight compound, or a high-molecular-weight compound. Examples of the organic functional group include a carboxy group, a phenolic hydroxyl group, lactones, carboxylic anhydrides, and amino groups. The low-molecular-weight compound is, for example, a surfactant, which shows surface-activating effect, examples thereof including any anionic surfactant, cationic surfactant, amphoteric surfactant and nonionic surfactant, and a silane coupling agent (a). Particularly preferred are anionic surfactants, for example, sodium dodecylsulfate (SDS) and sodium dodecylbenzenesulfate (SDBS), and steroid surfactants such as sodium cholate (SC) and sodium deoxycholate (DOC). Examples of the high-molecular-weight compound include carboxymethyl cellulose and derivatives thereof, hydroxypropylcellulose and derivatives, and other polysaccharide polymers, which each have, in a skeleton thereof, a polysaccharide structure; electroconductive polymers such as aromatic polyamide resin, aromatic vinyl resin, styrene resin, aromatic polyimide resin, and polyaniline; polymers each having, in a skeleton thereof, a polystyrene sulfonic acid derivative aromatic structure, such as polystyrene sulfonic acid and poly-α-methylstyrene sulfonic acid.

The method for producing the organically modified carbon nanotube is not particularly limited. Examples thereof include a gas-phase oxidation method, which is according to heating in air, an oxidation method according to electrochemical treatment, an oxidation method according to strong acid treatment, a micelle solubilization method, and a physically-adsorbing solubilization method.

The oxidation method according to strong acid treatment is, for example, a method of adding a carbon nanotube to a strong acid solution, and then applying ultrasonic waves to the solution (using, for example, a bath-type ultrasonic device) to produce an oxidized carbon nanotube having a carboxyl-group-introduced surface. About an oxidized carbon nanotube yielded by each of the above-mentioned oxidation methods, according to, for example, a manner of causing a carbon nanotube to react with an organic compound having a functional group reactive with a carboxyl group, or according to a dehydrating condensation reaction using the above-mentioned silane coupling agent (a) (for example, a silane coupling agent having, for example, an alkoxy group or an amino group), the organic compound can be bonded to the carbon nanotube. The silane coupling agent (a) is preferably an oligomer type silane coupling agent, and is, for example, a commercially available product as, for example, "KC-89S" (manufactured by Shin-Etsu Chemical Co., Ltd.).

The micelle solubilization method is, for example, a method of putting a carbon nanotube into an aqueous micelle solution of a surfactant as described above, and then applying ultrasonic waves from an ultrasonic homogenizer to the solution to micellize the carbon nanotube.

The physically adsorbing solubilization method is, for example, a method of adding a carbon nanotube to a solution in which the high-molecular-weight compound as described above is dissolved, mixing the carbon nanotube with the solution, and using a hydrophobic interaction between these two to cause the high-molecular-weight compound to be physically adsorbed onto the carbon nanotube.

A specific example of the above-mentioned micelle solubilization method is a method of: putting the carbon nanotube into an aqueous micelle solution of a surfactant as described above(surfactant concentration: about 0.1 to 1% by weight); applying ultrasonic waves from an ultrasonic homogenizer to the solution to yield a solution of the micellized carbon nanotube (carbon nanotube concentration: about 0.1 to 1% by weight); next adding, to the resultant aqueous solution, a cleaning organic solvent (such as methanol or acetone) in which the surfactant is to be dissolved; and subjecting the resultant to suction filtration to produce a solid-form organically modified carbon nanotube. The resultant solid-form organically modified carbon nanotube is preferably dried to remove the solvent completely. The method for the drying is not particularly limited. Examples thereof include hot-air drying, reduced-pressure drying, freeze drying, and spray drying. It is preferred to perform the reduced-pressure drying, for example, at a temperature of about 50 to 150° C. under a reduced pressure (of about 0.01 to 100 Pa). Before the application of the ultrasonic waves from the ultrasonic homogenizes, a bath-type ultrasonic device may be used to disperse the carbon nanotube beforehand in the solution.

The quantity of the modification (bonding) of the organic compound in the organically modified carbon nanotube is affected by a period for the application of ultrasonic waves from the ultrasonic homogenizer. Thus, in order to yield a carbon nanotube showing a weight loss proportion of 10 to 30% by weight in a range from 200 to 600° C. in a thermogravimetry thereof, the period for the application of the ultrasonic waves from the ultrasonic homogenizer is preferably from 1 to 30 hours, more preferably from 2 to 24 hours, even more preferably from 5 to 15 hours. The power of the ultrasonic homogenizer is preferably from about 100 to 500 W, and the applying-treatment temperature is preferably from about 0 to 50° C.

The organically modified carbon nanotube is also usable in the form of a carbon-nanotube-including dispersion liquid (carbon nanotube concentration: about 0.1 to 1% by weight) yielded by adding the organically modified carbon nanotube to an aqueous micelle solution of a surfactant as described above (surfactant concentration: about 0.1 to 1% by weight) and applying ultrasonic waves from an ultrasonic homogenizer to the resultant. Moreover, the organically modified carbon nanotube may be directly dispersed into a medium made mainly of water to yield a carbon-nanotube-including dispersion liquid. Such carbon-nanotube-including dispersion liquids may be used singly or in any combination of two or more thereof.

The above-mentioned silane coupling agent may be any ordinary silane coupling agent for rubber. Examples thereof include sulfide silanes such as bis(3-triethoxysilylpropyl) tetrasulfide, bis(3-triethoxysilylpropyl) disulfide, bis(2-triethoxysilylethyl) tetrasulfide, bis(4-triethoxysilyibutyl) disulfide, bis(3-trimethoxysilylpropyl) tetrasulfide, and bis(2-trimethoxysilylethyl) disulfide; mercaptosilanes such as 3-mercaptopropyltrimethoxysilane, 3-mercaptopropyltriethoxysilane, 3-mercaptopropylmethyldimethoxy silane, 3-mercaptopropyldimethylmethoxysilane, and mercaptoethyltriethoxysilane; and protected mercaptosilanes such as 3-octanoylthio-1-propyltriethoxysilane, and 3-propionylthiopropyltrimethoxysilane. Such silane coupling agents may be used singly or in any combination of two or more thereof.

Hereinafter, a description will be made about blend amounts of each component in the rubber masterbatch of the present invention.

The amount of the carbon nanotube is preferably from 0.1 to 3 parts by weight, more preferably from 0.2 to 2 parts by weight, even more preferably from 0.4 to 1 part by weight for 100 parts by weight, of the rubber component in the rubber masterbatch to yield a vulcanized rubber having a low electrical resistance and a low hysteresis loss.

The amount of the silane coupling agent is preferably from 0.1 to 3 parts by weight, more preferably from 0.2 to 2 parts by weight, even more preferably from 0.4 to 1 part by weight for 100 parts by weight of the rubber component in the rubber masterbatch to yield a vulcanized rubber having a low electrical resistance and a low hysteresis loss. When the rubber masterbatch is used as a rubber composition that will be described later, the amount of the silane coupling agent is preferably from 1 to 30 parts by weight, more preferably from 2 to 20 parts by weight, even more preferably from 4 to 10 parts by weight for 100 parts by weight of the rubber component in the rubber composition.

Method for Producing Rubber Masterbatch

The method for producing a rubber masterbatch of the present invention includes the step of dry-mixing and/or wet-mixing the diene rubber, the carbon nanotube, and the silane coupling agent each detailed above with each other.

The method for the drying-mixing is, for example, a method of using a kneading machine used in an ordinary rubber industry, such as a Banbury mixer, a kneader or a roll, to mix/knead the diene rubber, the carbon nanotube, and the silane coupling agent. The number of times of the mixing/kneading may be one or more. The period for the mixing/kneading is varied in accordance with the size of the used kneading machine, and other factors, and is usually from about 2 to 5 minutes. The mixture-discharging temperature of the kneading machine is preferably from 120 to 170° C., more preferably from 120 to 150° C. The entire components of the diene rubber, the carbon nanotube, and the silane coupling agent may be simultaneously added to the machine, and mixed/kneaded. These components may be added thereto in any order, and mixed/kneaded.

The method for the wet-mixing is a method of adding a rubber latex solution of the diene rubber, the carbon-nanotube-including dispersion liquid, and the silane coupling agent to a dispersing machine (such as a highly shearing mixer, a High Shear Mixer, a homo-mixer, a ball mill, a bead mill, a high-pressure homogenizer, an ultrasonic homogenizer or a colloid mill), and then using this dispersing machine to mix these components with each other in a liquid phase.

A specific example of the rubber masterbatch producing method including the wet-mixing step is a producing method (1) including a step (i-(a)) of wet-mixing a rubber latex solution of the diene rubber with a dispersion liquid including the carbon nanotube to produce a carbon-nanotube-including rubber latex solution; a step (ii-(a)) of drying the resultant carbon-nanotube-including rubber latex solution to produce a carbon-nanotube-including rubber composite; and a step (iii-(a)) of adding the silane coupling agent to the resultant carbon-nanotube-including rubber composite, and dry-mixing these materials with each other. Another specific example thereof is a producing method (2) including a step (i-(b)) of wet-mixing a rubber latex solution of the diene rubber, a dispersion liquid including the carbon nanotube, and the silane coupling agent: with each other to produce a rubber latex solution which includes the carbon nanotube and the silane coupling agent; and a step (ii-(b)) of drying the resultant rubber latex solution, which includes the carbon nanotube and the silane coupling agent, to produce a rubber composite which includes the carbon nanotube and the silane coupling agent.

The step (i-(a)) is a step of performing the wet-mixing to produce a carbon-nanotube-including rubber latex solution. The step (i-(b)) is a step of performing the wet-mixing to produce a rubber latex solution which includes the carbon nanotube and the silane coupling agent. In the wet-mixing, the period for the mixing is varied in accordance with the size of the used dispersing machine, and other factors, and is usually from about 1 to 10 minutes. The component-mixing temperature is usually from 30 to 100° C. In the step (i-(b)), the entire components of the rubber latex solution of the diene rubber, the carbon-nanotube-including dispersion liquid, and the silane coupling agent may be simultaneously added to the machine to perform the wet-mixing. These components may be added thereto in any order to perform the wet-mixing.

The step (ii-(a)) is a step of drying the carbon-nanotube-including rubber latex solution yielded in the step (i-(a)) to produce a carbon-nanotube-including rubber composite. The step (ii-(b)) is a step of drying the resultant rubber latex solution yielded in the step (i-(b)), which includes the carbon nanotube and the silane coupling agent, to produce a rubber composite which includes the carbon nanotube and the silane coupling agent.

The method for the drying in each of the steps (ii-(a)) and (ii-(b)) is, for example, a method of attaining the drying, using a drying machine that may be of various types, such as a monoaxial extruder, an oven, a vacuum drier, or an air drier. The drying may be performed under an ordinary pressure. However, the drying is preferably performed under a reduced pressure (of about 10 to 1000 Pa). The drying period is varied in accordance with the size of the used drying machine, and other factors. Usually, the period is usually from about 30 to 180 minutes under a reduced pressure. The drying temperature of the drying machine is usually from about 50 to 150° C.

When the carbon-nanotube-including dispersion liquid is a carbon-nanotube-including dispersion liquid micellized with a surfactant as described above, the drying period can be shortened by collapsing the micelle (cancelling the micellization) before the dry step. From this viewpoint, for example, an organic solvent such as methanol or ethanol may be added to the carbon-nanotube-including rubber latex solution.

The step (iii-(a)) is a step of adding the silane coupling agent to the resultant carbon-nanotube-including rubber composite, and dry-mixing these materials with each other. The method for the drying-mixing is, for example, a method of using a kneading machine used in an ordinary rubber industry, such as a Banbury mixer, a kneader or a roll to mix/knead the materials. The number of times of the mixing/kneading may be one or more. The period for the mixing/kneading is varied in accordance with the size of the used kneading machine, and other factors, and is usually from about 2 to 5 minutes. The discharging temperature of the kneading machine is preferably from 120 to 170° C., more preferably from 120 to 150° C.

The rubber masterbatch producing method of the present invention preferably includes the manner of wet-mixing at least the rubber latex solution of the diene rubber and the carbon-nanotube-including dispersion liquid with each other in a liquid phase (any one of the steps (i-a) and (i-(b)). The method more preferably includes the manner of adding the silane coupling agent to the liquid phase to wet-mix the existing components (the step i-(b)).

Various Blending Agents

Furthermore, various blending agents are usable in the rubber masterbatch to make the rubber masterbatch into a rubber composition. The usable blending agents may be blending agents used ordinarily in the rubber industry, examples thereof including a sulfur-containing vulcanizing agent, a vulcanization accelerator, an antiaging agent, silica, carbon black, zinc oxide, a methylene receptor and a methylene donor, stearic acid, a vulcanization accelerator aid, a vulcanization retardant, an organic peroxide, softeners such as wax and oil, and a processing aid. Out of the various blending agents, silica, carbon black and softeners such as wax and oil may be used in the production of the rubber masterbatch.

Sulfur as the sulfur-containing vulcanizing agent may be of any ordinary sulfur species for rubbers. Examples thereof include powdery sulfur, precipitated sulfur, insoluble sulfur, and highly dispersible sulfur. Such sulfur-containing vulcanizing agents may be used singly or in any combination of two or more thereof.

The sulfur content in the rubber composition is preferably from 0.3 to 6.5 parts by weight for 100 parts by weight of the rubber component in the rubber composition. If the sulfur content is less than 0.3 parts by weight, the resultant vulcanized rubber is short in cross linkage density to be lowered in rubber strength and others. If the content is more than 6.5 parts by weight, the rubber is deteriorated, particularly, in both of heat resistance and durability. In order to keep the rubber strength of the vulcanized rubber good surely and further improve the heat resistance and the durability, the sulfur content is set into a range more preferably from 1.0 to 5.5 parts by weight for 100 parts by weight of the rubber component in the rubber composition.

The vulcanization accelerator may be an ordinary vulcanization accelerator for rubbers. Examples thereof include sulfenamide type, thiuram type, thiazole type, thiourea type, guanidine type, and dithiocarbamate type vulcanization accelerators. Such vulcanization accelerators may be used singly or in any combination of two or more thereof.

The vulcanization accelerator content in the rubber composition is preferably from 1 to 5 parts by weight for 100 parts by weight of the rubber component in the rubber composition.

The antiaging agent may be an ordinary antiaging agent for rubbers, examples thereof including aromatic amine type, amine-ketone type, monophenolic type, bisphenolic type, polyphenolic type, dithiocarbamate type, and thiourea type antiaging agents. Such antiaging agents may be used singly or in any combination of two or more thereof.

The antiaging agent content in the rubber composition is preferably from 1 to 5 parts by weight for 100 parts by weight of the rubber component in the rubber composition.

The above-mentioned silica may be of any species as far as the silica species is usable as a filler for reinforcement. The silica species is preferably wet silica (hydrous silica). Colloidal properties of the silica are not particularly limited. The nitrogen adsorption specific surface area (BET) thereof according to a BET method is preferably from 150 to 250 $m^2/g$, more preferably from 180 to 230 $m^2/g$. The BET of the silica is measured by the BET method described in ISO 5794. Silica species as described above may be used singly or in any combination of two or more thereof.

The silica content in the rubber composition is preferably from 40 to 100 parts by weight, more preferably from 50 to 80 parts by weight for 100 parts by weight of the rubber component in the rubber composition.

In the blending (addition) of the various blending agents, a method for the blending is not particularly limited. The method may be, for example, a method of adding components other than the sulfur-containing component, such as the sulfur-containing vulcanizing agent and vulcanization accelerator, in any order, and further mixing/kneading the mixed components; a method of adding the other components simultaneously, and mixing/kneading the components; or a method of adding, the entire components simultaneously, and mixing/kneading the components. The number of times of the mixing/kneading may be one or more. The period for the mixing/kneading is varied in accordance with the size of the used kneading machine, and other factors, and is usually from about 2 to 5 minutes. The mixture-discharging temperature of the kneading machine is preferably from 120 to 170° C., more preferably from 120 to 150° C. When the rubber composition includes the above-mentioned vulcanization components, the mixture-discharging temperature of the kneading machine is set into a range preferably from 80 to 110° C., more preferably from 80 to 100° C.

A vulcanized rubber obtained from the rubber masterbatch or the rubber composition of the present invention has a low electrical resistance (low volume electrical resistance value) and a low hysteresis loss to be suitable for pneumatic tires.

EXAMPLES

Hereinafter, the present invention will be described by way of examples thereof. However, the present, invention is never limited by the examples.

Used Materials a) Styrerie-butadiene rubber (SBR) : "JSR 1502" (manufactured by JSR Corporation)

b) Carbon nanotube (CNT) : "MeiJO Arc-SO" (manufactured by Meijo Mano Carbon Co., Ltd.; average diameter: 1.4 nm)

c) Silane coupling agent: Bis(3-triethoxysilylpropyl)tetrasulfide, "Si 69" (manufactured by Degussa AG)

d) Silica: "NIPSIL AQ" (manufactured by Nippon Silica Industries Co., Ltd. ; BET=205 $m^2/g$)

e) Zincflower: "ZincFlower No. 1" (manufactured by Mitsui Mining & Smelting Co., Ltd.)

f) Antiaging agent: "ANTIGEN 6C" (manufactured by Sumitomo Chemical Co., Ltd.)

g) Stearic acid: "LUNAC S-20" (manufactured by Kao Corporation)

h) Wax; "OZOACE 0355" (manufactured by Nippon Seiro Co., Ltd.)

i) Oil; "PROCESS P200" (manufactured by Jomo Sun-Energy Co., Ltd.)

j) Sulfur: "5%-Oil-Blended Sulfur Fine Powder" (manufactured by Tsurumi Chemical Industry Co., Ltd.)

k) Vulcanization accelerator : "SOXINOL CZ" (manufactured by Sumitomo Chemical Co., Ltd.)

l) SBR latex solution: "ROADEX" (manufactured by JSR Corporation; solid concentration: 50% by weight)

Preparation of Organically Modified Carbon Nanotube

Preparation Example 1 (Carbon Nanotube (CNT) of 1.2% Weight Loss Proportion

Into 300 mL of distilled water was dissolved 3 g of sodium deoxycholate (DOC) as a surfactant to prepare an aqueous surfactant solution having a concentration of 1% weight/volume. Into this aqueous solution was added 2.2 g of a CNT. While this system was cooled, ultrasonic waves from an ultrasonic homogenizer "Sonifer SFX 550" manufactured by Emerson Japan, Ltd.) were applied thereto for 10 hours to micellize the CNT into the aqueous solution of the surfactant. Next, the aqueous CNT-micellized solution was centrifuged at 50,000 rpm for 1 hour, and then the supernatant (about 90% by volume of the whole) was collected. The supernatant contained neither any CNT having a low crystallinity, any catalytic metal, amorphous carbon, nor any other impurity. Next, methanol was added to the supernatant to yield a CNT dispersion liquid in which the micellization of the CNT was cancelled. The CNT dispersion liquid was then subjected to suction filtration to yield a solid-form CNT. Furthermore, the solid-form CNT was dispersed into each of solvents, i.e., distilled water and methanol, and the resultant was filtered. These operations were repeated to rinse the solid. In this way, any extra fraction of the surfactant that was contained into the solid-form CNT was removed. After the rinsing, the resultant solid-form CNT was heated in a vacuum (at about $10^{-4}$ Pa) at 500° C. for 4 hours to be annealed. In this way, an organically modified CNT of 1.57 g in weight was yielded.

A thermogravimeter ("TGA-50" manufactured by Shimadzu Corporation) was used to subject a sample of the organically modified CNT yielded as described above to thermogravimetry at a temperature elevation rate of 10° C./minute from an ambient temperature (about 25° C.) in a dry air atmosphere. In this way, the weight loss proportion of the sample was calculated out as the proportion of a decrease in the weight (weight loss proportion) from 200 to 600° C. As a result, the weight loss proportion of this sample was 1.2%. This sample was used as a CNT of 1.2% weight loss proportion.

Preparation Example 2 (CNT of 11.1% Weight Loss Proportion)

Into 300 mL, of distilled water was dissolved 3 g of sodium deoxycholate (DOC) as a surfactant to prepare an aqueous surfactant-including solution having a concentration of 1% weight/volume. Into this aqueous solution was added 2.2 g of a CNT. While this system was cooled, ultrasonic waves from an ultrasonic homogenize ("Sonifer SFX 550" manufactured by Emerson Japan, Ltd.) were applied thereto for 2 hours to micellize the CNT into the aqueous solution of the surfactant. Next, methanol was added to the aqueous CNT-micellized solution to yield a CNT dispersion liquid in which the micellization of the CNT was cancelled. The CNT dispersion liquid was then subjected to suction filtration to yield a solid-form CNT. Furthermore, the solid-form CNT was dispersed into each of solvents, i.e., distilled water and methanol, and the resultant was filtrated. These operations were repeated to rinse the solid. In this way, any extra fraction of the surfactant that was contained into the solid-form CNT was removed. After the rinsing, the resultant solid-form CNT was dried under a reduced pressure (at about $10^{-4}$ Pa) at 100° C. for 24 hours to yield an organically modified CNT. The resultant organically modified CNT was subjected to the same thermogravimeter as described above. As a result, the weight loss proportion of this sample was 11.1%. This sample was used as a CNT of 11.1% weight loss proportion.

Preparation Examples 3 to 5 (Respective CNTs of 16.6%, 22.3% and 26.7% Weight Loss Proportions Organically modified CNTs were yielded in the same way as in Preparation Example 2 except that the period for the application of the ultrasonic waves from the ultrasonic homogenizer in Preparation Example 2 was changed to 7 hours, 14 hours, and 24 hours, respectively. The resultant organically modified CNTs were each subjected to the same thermogravimeter as described above. As a result, the weight loss proportions of these samples were 16.6%, 22.3% and 26.7%, respectively. These samples were used as CNTs having weight loss proportions of 16.6%, 22.3% and 26.7%, respectively.

Preparation Example 6 (CNT of 35.2% Weight Loss Proportion)

Into 1 L of concentrated nitric acid (concentration: 70%) was added 20 g of the CNT the weight loss proportion of which was 22.3%, out of the CNTs yielded as described above, and ultrasonic waves from a bath-type ultrasonic machine ("BRANSONIC CPX Model 8800" manufactured by Emerson Japan, Ltd.) were applied thereto for 3 hours. The dispersion liquid was then subjected to suction filtration to yield a solid-form CNT. Furthermore, the solid-form CNT was dispersed into each of solvents, i.e., distilled water and methanol, and the resultant was filtrated. These operations were repeated to rinse the solid. After the rinsing, the resultant solid-form CNT was dried under a reduced pressure (at about $10^{-4}$ Pa) at 100° C. for 24 hours to yield an organically modified CNT. The resultant organically modified CNT was subjected to the same thermogravimeter as described above. As a result, the weight loss proportion of this sample was 35.2%. This sample was used as a CNT of 35.2% weight loss proportion.

Example 1

Production of Rubber Masterbatch and Unvulcanized Rubber Composition

A Banbury mixer was used to dry-mix SBR shown in Table if one of the CNTs (organically modified CNT yielded in Preparation Example 2 (CNT of 11.1% weight loss proportion)), and a silane coupling agent with each other (mixing/kneading period; 3 minutes, and mixture-discharging temperature: 150° C.) to produce a rubber masterbatch (dry step (1) in Table 1). Next, the Banbury mixer was used to dry-mix raw materials shown in Table 1 (components other than sulfur and any vulcanization accelerator) with the rubber masterbatch (mixing/kneading period: 3 minutes, and mixture-discharging temperature: 150° C. to produce a rubber composition (dry step (2) in Table 1). Furthermore, sulfur and a vulcanization accelerator shown in Table 1 were added into the resultant rubber composition, and the Banbury mixer was used to dry-mix the components with each other (mixing/kneading period: 1 minute, and mixture-discharging temperature: 90° C.) to produce an unvulcanized rubber composition (dry step (3)) in Table 1). In Table 1, the blend amount of each of the components is represented as an amount in the unit of a part or parts by weight (phr) of the component when the entire amount of the rubber component was regarded as 100 parts by weight.

Examples 2 to 4, and Comparative Examples 1 to 4

Production of Rubber Masterbatches and Unvulcanized Rubber Compositions

In each of the examples, a rubber masterbatch and an unvulcanized rubber composition were produced in the same way as in Example 1 except that the used raw material system and/or the blend amount(s) of one or more of the raw materials was/were changed as shown in Table 1

Vulcanized Rubber Production

The unvulcanized rubber composition yielded in each of Examples 1 to 4, and Comparative Examples 1 to 4 was vulcanized at 150° C. for 30 minutes to produce a vulcanized rubber. About the resultant vulcanized rubber, evaluations described below were made. The evaluation results are shown in Table 1.

Volume Electrical Resistance Value Evaluations

In an evaluation of the volume electrical resistance value of the resultant vulcanized rubber, a device, Hiresta UP, manufactured by Mitsubishi Chemical Analytech Co., Ltd. was used to measure the volume electrical resistance value of a test piece (thickness: 2 mm) of the rubber. The common logarithm of the volume electrical resistance value was taken, and the resultant value was represented as an index relative to the value of Comparative Example 1, this value being regarded as 100. It is demonstrated that as the value is smaller, the rubber is smaller in volume electrical resistivity to be lower in volume electrical resistance value.

Loss Tangent (tan δ) Evaluation

In an evaluation of the loss tangent (tan δ) of the resultant vulcanized rubber, a viscoelasticity tester manufactured by Toyo Seiki Seisaku-sho, Ltd. was used to me as tire the loss tangent, of a sample of the rubber at a frequency of 10 Hz, a static strain of 10%, and a dynamic strain of 30% at a temperature of 60° C. The resultant value was represented as an index relative to the value of Comparative Example 1, this value being regarded as 100. It is demonstrated, about the tan δ at 60° C. that as the index value is smaller, the rubber is better in hysteresis loss.

TABLE 1

|  |  | Example 1 | Example2 | Example 3 | Example 4 | Comparative Example 1 | Comparative Example 2 | Comparative Example 3 | Comparative Example 4 |
|---|---|---|---|---|---|---|---|---|---|
|  | Weight loss proportion (%) of used carbon nanotube (CNT) | 11.1% | 16.6% | 22.3% | 26.7% | 1.2% | 35.2% | 1.2% | 35.2% |
| Dry step (1) | SBR | 100 | 100 | 100 | 100 | 100 | 100 | 100 | 100 |
|  | CNT | 0.5 | 0.5 | 0.5 | 0.5 | 0.5 | 0.5 | 0.5 | 0.5 |
|  | Silane coupling agent | 0.5 | 0.5 | 0.5 | 0.5 |  |  | 0.5 | 0.5 |
| Dry step (2) | Silica | 60 | 60 | 60 | 60 | 60 | 60 | 60 | 60 |
|  | Silane coupling agent | 6 | 6 | 6 | 6 | 6 | 6 | 6 | 6 |
|  | Zinc flower | 3 | 3 | 3 | 3 | 3 | 3 | 3 | 3 |
|  | Antiaging agent | 2 | 2 | 2 | 2 | 2 | 2 | 2 | 2 |
|  | Stearic acid | 2 | 2 | 2 | 2 | 2 | 2 | 2 | 2 |
|  | Wax | 2 | 2 | 2 | 2 | 2 | 2 | 2 | 2 |
|  | Oil | 10 | 10 | 10 | 10 | 10 | 10 | 10 | 10 |
| Dry step (3) | Sulfur | 1.5 | 1.5 | 1.5 | 1.5 | 1.5 | 1.5 | 1.5 | 1.5 |
|  | Vulcanization accelerator | 1.8 | 1.8 | 1.8 | 1.8 | 1.8 | 1.8 | 1.8 | 1.8 |
| Evaluations | Volume electrical resistance value | 92 | 84 | 81 | 83 | 100 | 123 | 95 | 112 |
|  | tan δ | 87 | 81 | 76 | 78 | 100 | 124 | 94 | 109 |

Preparation of CNT—Including Dispersion Liquids

Preparation Example 7

Into 300 mL of distilled water was dissolved 3 g of sodium dodecylsulfate (SOS) as a surfactant to prepare individual fractions of an aqueous surfactant solution (total number of the fractions: 6) having a concentration of 1% weight/volume. Into the individual fractions of the aqueous solution were added the respective organically modified CNTs (1.2%, 11.1%, 16.6%, 22.3%, 26.7%, and 35.2% CNTs), the amount of each of which was 5 g. While the solution fractions were cooled, ultrasonic waves from an ultrasonic homogenizer ("Sonifer SFX 350" manufactured by Emerson Japan, Ltd.) were applied to the solutions for 2 hours to micellize the 6-species CNTs into the aqueous surfactant solution fractions, respectively, to yield individual CNT-including dispersion liquids.

Example 5

Production of Rubber Masterbatch, and Unvulcanized Rubber Composition

Into a container equipped with a stirrer ("SUPER MIXER PICCOLO" manufactured by KAWATA Mfg. Co., Ltd.) were put an SBR latex (rubber component: 300 g) shown in Table 2, and the CNT-including dispersion liquid (CNT component: 1.5g) the weight loss proportion of which was 11.1%, out of the CNT-including dispersion liquids yielded as described above, and then the liquid was stirred at 700 rpm and room temperature for 1 hour to produce a CNT-including rubber latex solution (step (i-(a)): wet step (1) in Table 2). Next, methanol (1000 g) was added to the resultant CNT-including rubber latex solution, and these liquids were mixed with each other. The mixture was then subjected to suction filtration, and the resultant solid was collected. Thereafter, in order to remove any unnecessary fraction of the solvent, the solid was dried at 100° C. under a reduced pressure (of about $10^{-4}$ Pa) for 24 hours to produce a CNT-including rubber composite (step (ii-(a))). A Bunbury mixer was used to dry-mix the CNT-including rubber composite with a silane coupling agent shown in Table 2 (mixing/kneading period: 3 minutes, and mixture-discharging temperature: 150° C.) to produce a rubber masterbatch (step (iii-(a): dry step (1) in Table 2). Next, the Banbury mixer was used to dry-mix raw materials shown in Table 2 (components other than sulfur and any vulcanization accelerator) with the rubber masterbatch (mixing/kneading period; 3 minutes, and mixture-discharging temperature: 150° C.) to produce a rubber composition (dry step (2)). Furthermore, sulfur and a vulcanization accelerator shown in Table 2 were added into the resultant rubber composition, and the Banbury mixer was used to dry-mix the components with each other (mixing/kneading period: 1 minute, and mixture-discharging temperature: 90° C.) to produce an unvulcanized rubber composition (dry step (3) in Table 2). In Table 2, the blend amount of each of the components is represented as an amount in the unit of a part or parts by weight (phr) of the component when the entire amount of the rubber component was regarded as 100 parts by weight.

Examples 6 to 8, and Comparative Examples 5 to 8

Production of Rubber Masterbatches and Unvulcanized Rubber Compositions

In each of the examples, a rubber masterbatch and an unvulcanized rubber composition were produced in the same way as in Example 5 except that the used raw material system and/or the blend amount(s) of one or more of the raw materials was/were changed as shown in Table 2.

Example 9

Production of Rubber Masterbatch, and Unvulcanized Rubber Composition

Into a container equipped with a stirrer ("SUPER MIXER PICCOLO" manufactured by KAWATA Mfg. Co., Ltd.) were put an SBR latex (rubber component: 300 g) shown in Table 2, and the CNT-including dispersion liquid (CNT component: 1.5 g) the weight loss proportion of which was 11.1%, out of the CNT-including dispersion liquids yielded as described above. The liquid was then stirred at 700 rpm and room temperature for 1 hour, and then a silane coupling agent (1.5 g) was further added thereto. The liquid was stirred at 90° C. and 100 rpm for 3 minutes to produce a rubber latex solution including the CNT and the silane coupling agent (step (i-(b)): wet step (1) in Table 2). Next, methanol (1000 g) was added to the resultant CNT-and-silane-coupling-agent-including rubber latex solution, and these liquids were mixed with each other. The mixture was then subjected to suction filtration, and the resultant solid was collected. Thereafter, in order to remove any unnecessary fraction of the solvent, the solid was dried at 100° C. under a reduced pressure (of about $10^{-4}$ Pa) for 24 hours to produce a CNT-and-silane-coupling-agent-including rubber composite (step (ii-(b)): dry step (1) in Table 2). A Banbury mixer was used to dry-mix the CNT-and-silane-coupling-agent-including rubber composite with raw materials shown in Table 2 (components other than sulfur and any vulcanization accelerator) (mixing/kneading period: 3 minutes, and mixture-discharging temperature; 150° C. to produce a rubber composition (dry step (2) in Table 2). Furthermore, sulfur and a vulcanization accelerator shown in Table 2 were added into the resultant rubber composition, and the Banbury mixer was used to dry-mix the components with each other (mixing/kneading period; 1 minute, and mixture-discharging temperature: 90° C.) to produce an unvulcanized rubber composition (dry step (3)) in Table 2). In Table 2, the blend amount of each of the components is represented as an amount in the unit of a part or parts by weight (phr) of the component when the entire amount of the rubber component was regarded as 100 parts by weight.

Examples 10 to 12, and Comparative Example 9

Production of Rubber Masterbatches and Unvulcanized Rubber Compositions

In each of the examples, a rubber masterbatch and an unvulcanized rubber composition were produced in the same way as in Example 9 except that the used raw material system and/or the blend amount(s) of one or more of the raw materials was/were changed as shown in Table 2.

Vulcanized Rubber Production

The unvulcanized rubber composition yielded in each of Examples 5 to 12, and Comparative Examples 5 to 9 was vulcanized at 150° C. for 30 minutes to produce a vulcanized rubber. About the resultant vulcanized rubber, the same evaluations as described above were made. The evaluation results are shown in Table 2.

TABLE 2

| | | Example 5 | Example 6 | Example 7 | Example 8 | Example 9 | Example 10 | Example 11 |
|---|---|---|---|---|---|---|---|---|
| | Weight loss proportion (%) of used carbon nanotube (CNT) | 11.1% | 16.6% | 22.3% | 26.7% | 11.1% | 16.6% | 22.3% |
| Wet step (1) | SBR latex (solid) | 100 | 100 | 100 | 100 | 100 | 100 | 100 |
| | CNT-including dispersion liquid (CNT solid content) | 0.5 | 0.5 | 0.5 | 0.5 | 0.5 | 0.5 | 0.5 |
| | Silane coupling agent | | | | | 0.5 | 0.5 | 0.5 |
| Dry step (1) | Silane coupling agent | 0.5 | 0.5 | 0.5 | 0.5 | | | |
| Dry step (2) | Silica | 60 | 60 | 60 | 60 | 60 | 60 | 60 |
| | Silane coupling agent | 6 | 6 | 6 | 6 | 6 | 6 | 6 |
| | Zinc flower | 3 | 3 | 3 | 3 | 3 | 3 | 3 |
| | Antiaging agent | 2 | 2 | 2 | 2 | 2 | 2 | 2 |
| | Stearic acid | 2 | 2 | 2 | 2 | 2 | 2 | 2 |
| | Wax | 2 | 2 | 2 | 2 | 2 | 2 | 2 |
| | Oil | 10 | 10 | 10 | 10 | 10 | 10 | 10 |
| Dry step (3) | Sulfur | 1.5 | 1.5 | 1.5 | 1.5 | 1.5 | 1.5 | 1.5 |
| | Vulcanization accelerator | 1.8 | 1.8 | 1.8 | 1.8 | 1.8 | 1.8 | 1.8 |
| Evaluations | Volume electrical resistance value | 60 | 52 | 48 | 51 | 53 | 47 | 43 |
| | tan δ | 68 | 66 | 62 | 65 | 66 | 61 | 56 |

| | | Example 12 | Comparative Example 5 | Comparative Example 6 | Comparative Example 7 | Comparative Example 8 | Comparative Example 9 |
|---|---|---|---|---|---|---|---|
| | Weight loss proportion (%) of used carbon nanotube (CNT) | 26.7% | 1.2% | 35.2% | 1.2% | 35.2% | 35.2% |
| Wet step (1) | SBR latex (solid) | 100 | 100 | 100 | 100 | 100 | 100 |
| | CNT-including dispersion liquid (CNT solid content) | 0.5 | 0.5 | 0.5 | 0.5 | 0.5 | 0.5 |
| | Silane coupling agent | 0.5 | | | | | 0.5 |
| Dry step (1) | Silane coupling agent | | | | 0.5 | 0.5 | |
| Dry step (2) | Silica | 60 | 60 | 60 | 60 | 60 | 60 |
| | Silane coupling agent | 6 | 6 | 6 | 6 | 6 | 6 |
| | Zinc flower | 3 | 3 | 3 | 3 | 3 | 3 |
| | Antiaging agent | 2 | 2 | 2 | 2 | 2 | 2 |
| | Stearic acid | 2 | 2 | 2 | 2 | 2 | 2 |
| | Wax | 2 | 2 | 2 | 2 | 2 | 2 |
| | Oil | 10 | 10 | 10 | 10 | 10 | 10 |

TABLE 2-continued

| | | | | | | | |
|---|---|---|---|---|---|---|---|
| Dry step (3) | Sulfur | 1.5 | 1.5 | 1.5 | 1.5 | 1.5 | 1.5 |
| | Vulcanization accelerator | 1.8 | 1.8 | 1.8 | 1.8 | 1.8 | 1.8 |
| Evaluations | Volume electrical resistance value | 45 | 70 | 81 | 66 | 74 | 68 |
| | tan δ | 58 | 81 | 94 | 75 | 84 | 33 |

What is claimed is:

1. A rubber masterbatch, comprising a diene rubber, a carbon nanotube, and a silane coupling agent,
wherein the carbon nanotube shows a weight loss proportion of 10 to 30% by weight in a range from 200 to 600° C. in a thermogravimetry of the carbon nanotube.

2. A rubber composition obtained from the rubber masterbatch recited in claim 1.

3. A method for producing the rubber masterbatch recited in claim 1, comprising the step of dry-mixing and/or wet-mixing the diene rubber, the carbon nanotube, and the silane coupling agent with each other.

4. The method for producing the rubber masterbatch according to claim 3, comprising:
a step (i-(a)) of wet-mixing a rubber latex solution of the diene rubber with a dispersion liquid including the carbon nanotube to produce a carbon-nanotube-including rubber latex solution;
a step ii-(a)) of drying the resultant carbon-nanotube-including rubber latex solution to produce a carbon-nanotube-including rubber composite; and
a step (iii-(a)) of adding the silane coupling agent to the resultant carbon-nanotube-including rubber composite, and dry-mixing these materials with each other.

5. The method for producing the rubber masterbatch according to claim 3, comprising:
a step (i-(b)) of wet-mixing a rubber latex solution of the diene rubber, a dispersion liquid including the carbon nanotube, and the silane coupling agent with each other to produce a rubber latex solution which includes the carbon nanotube and the silane coupling agent; and
a step (ii-(b)) of drying the resultant rubber latex solution, which includes the carbon nanotube and the silane coupling agent, to produce a rubber composite which includes the carbon nanotube and the silane coupling agent.

* * * * *